(12) United States Patent
Parvin et al.

(10) Patent No.: US 10,700,940 B2
(45) Date of Patent: Jun. 30, 2020

(54) NETWORK PLANNING AND OPTIMIZATION

(71) Applicant: Amazon Technologies, Inc., Seattle, WA (US)

(72) Inventors: Hoda Parvin, Seattle, WA (US); Russell John Allgor, Seattle, WA (US); Ozlem Bilginer, Seattle, WA (US); Timothy Lee Jacobs, Tempe, AZ (US); David John Michael, Dallas, TX (US)

(73) Assignee: Amazon Technologies, Inc., Seattle, WA (US)

(*) Notice: Subject to any disclaimer, the term of this patent is extended or adjusted under 35 U.S.C. 154(b) by 265 days.

(21) Appl. No.: 15/825,989

(22) Filed: Nov. 29, 2017

(65) Prior Publication Data

US 2019/0166009 A1     May 30, 2019

(51) Int. Cl.
    *H04L 12/24*     (2006.01)
(52) U.S. Cl.
    CPC ........ *H04L 41/145* (2013.01); *H04L 41/0803* (2013.01)
(58) Field of Classification Search
    CPC .............. H04L 41/145; H04L 41/0803; H04L 41/0806; H04L 41/08; H04L 41/50; H04L 47/125; H04L 47/70; H04L 47/72; H04L 47/78; H04L 47/823
    USPC ...................................................... 709/223
    See application file for complete search history.

(56) References Cited

U.S. PATENT DOCUMENTS

| | | | |
|---|---|---|---|
| 6,076,067 A | 6/2000 | Jacobs et al. | |
| 6,381,250 B1* | 4/2002 | Jacobson | H04B 7/18543 370/254 |
| 7,283,477 B1* | 10/2007 | Fedyk | H04L 45/02 370/237 |
| 8,107,458 B1* | 1/2012 | Ranganathan | H04L 41/12 370/254 |
| 2006/0059565 A1* | 3/2006 | Green | G06F 9/50 726/27 |
| 2006/0067217 A1* | 3/2006 | Li | H04L 45/00 370/230 |
| 2013/0080617 A1* | 3/2013 | Driesen | H04L 43/0876 709/224 |
| 2015/0081902 A1* | 3/2015 | Verchere | H04L 41/5051 709/225 |
| 2018/0124631 A1* | 5/2018 | Ramos de Azevedo | H04W 40/18 |

* cited by examiner

*Primary Examiner* — Ruolei Zong
(74) *Attorney, Agent, or Firm* — Knobbe Martens Olson & Bear LLP

(57) ABSTRACT

Features related to systems and methods for network planning based on optimization modeling of equipment and item transmissions. The network planning may include a model to plan for transmission of items over a network to maximize overall efficiencies over alternative transmission modes. The model may produce a network plan that schedules transmissions, determines the number and types of equipment needed to support the transmissions, assigns equipment to specific locations, and optimally routes items throughout the network.

20 Claims, 5 Drawing Sheets

NETWORK PLANNING AND OPTIMIZATION

BACKGROUND

The future is unknowable. This uncertainty presents many issues particularly in the field of network planning. If the future was known, the proper number of resources could be acquired and positioned to form a network today that ensures capacity is available to satisfy the expected network demand. The network plan provides capacity by planning transmissions to and from various locations. The network plan may specify the time for each transmission and equipment used for the transmission. In this way, the position of a given piece of equipment may change as the network plan is executed. The difficulty in estimation is further compounded by the fluid nature of the resources forming the network.

Current planning may be performed by fixing a schedule and then assigning resources to meet the fixed schedule. Such planning techniques can lead to underutilized resources or over utilized resources, which may in turn lead to network inefficiencies. For example, it may use resources to maintain a piece of equipment. Ideally, the benefit of maintaining the piece of equipment should meet or exceed the amount of resources needed to maintain the piece of equipment. When planning a network starting from a fixed schedule, such resources may not be identified or leveraged in the final network plan.

BRIEF DESCRIPTION OF THE DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
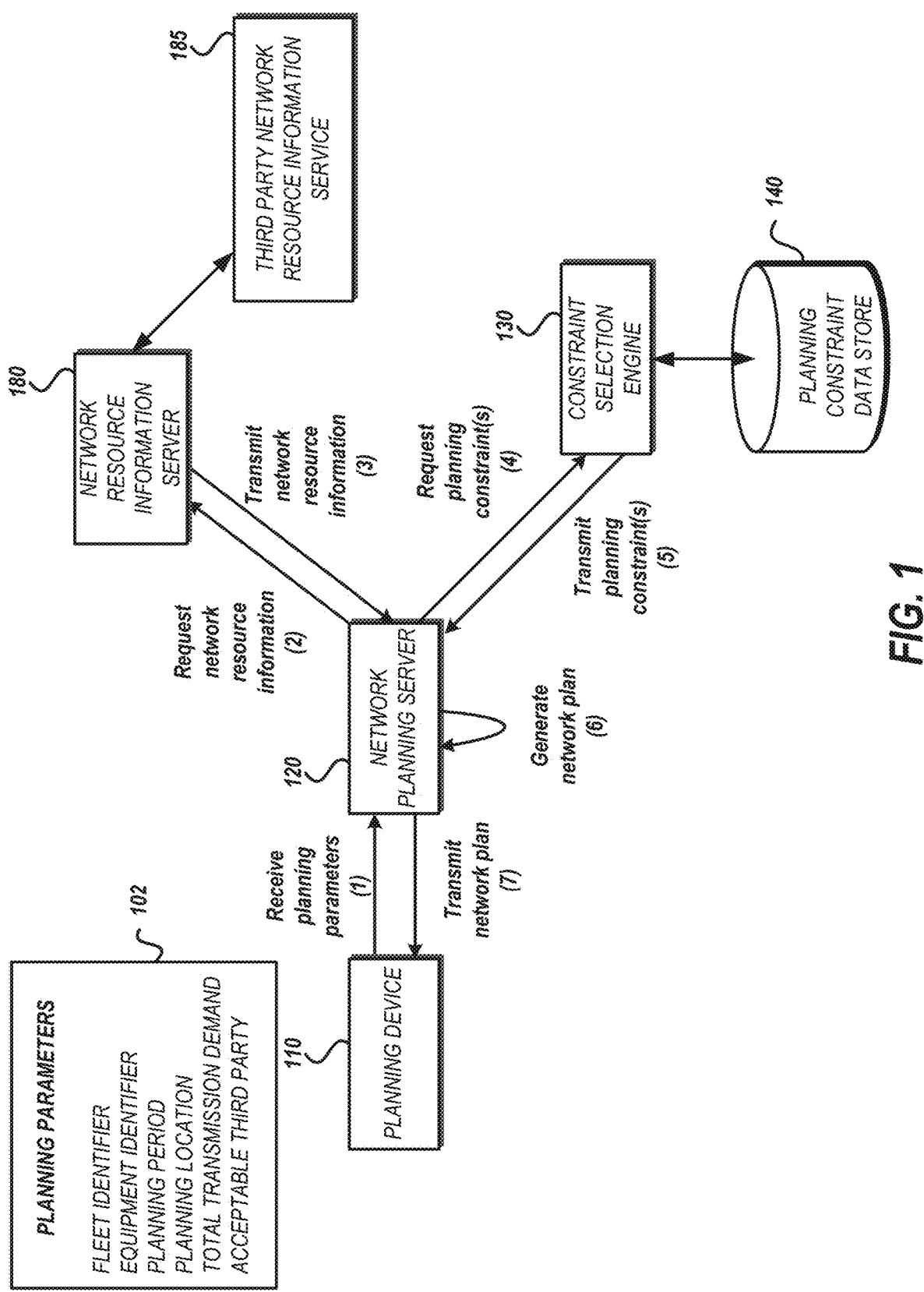
FIG. 1 is a pictorial diagram depicting a data flow of planning parameters being provided to a network planning server that generates an optimized network plan.

Generally described, aspects of the present disclosure relate to network planning based on optimization modeling of equipment and item transmissions. A transmission may include physical movement of an item from a first location to a second location. A transmission may include sending a message from a first communication device to a second communication device. The network planning may include a model for planning an air cargo network and simultaneously determine the optimal routing of items over the network to maximize overall cost savings over alternative transmission modes. The model may produce a network plan that schedules transmissions (e.g., a flight schedule), determine the number and types of equipment needed to support the transmissions (e.g., of aircraft and mix), assign fleet (e.g., equipment that are interchangeable substitutes (e.g., same type, same capacity, or same transmission qualifications)) to specific locations, and optimally route items throughout the network to, for example, align item demand with available transmission capacity. The model may provide both tactical and strategic solutions taking into account available equipment, station and hub facility capacity, the use of point to point and hub and spoke configurations, and other operational opportunities and restrictions for network plans that may be identified through iterative machine modeling.

Preexisting planning solutions can be tedious and time consuming as the number of resources that can be used for transmission increases. Furthermore, preexisting planning solutions may be inaccurate in that they attempt to allocate resources with a fixed schedule in an attempt to simplify the planning process. The features described overcome the deficiencies with such preexisting planning solutions and obtain its objectives in part by providing an integrated method and system which can be embodied in computer software for use with a computer for the rapid, efficient allocation of resources via a network plan. The network plan identifies specific quantities, places, and times for transmissions via specific network resources, thereby allowing for rapid, single-step generation of a network plan to be produced in a resource efficient manner (e.g., computational efficiency, memory efficiency, and efficiency in the transmissions indicated by the network plan). The features contribute to the generation of an optimized network plan that does not rely on a fixed scheduling framework to arrive at a timely allocation of network resources.

The present disclosure may refer to network planning for physical distribution networks such as aircraft or other vehicle planning for transmitting items. The technical features may be applied to other network planning fields such as packet network routing, transportation network routing, labor force routing, or other fields in which a finite set of resources can be organized into a network to perform a task.

In a physical distribution network, the term "item" or "product" may include common items made available for purchase or other acquisition electronically or via the Internet, such as apparel, cookware, and physical media (e.g., DVDs or CDs). As used herein, the term "item," in addition to having its ordinary meaning, may be used interchangeably to refer to an item itself (e.g., a particular product) and to its description or representation in a computer system, such as a shipping system or an electronic catalog. As will be apparent from the context in which it is used, the term is also sometimes used herein to refer only to the item itself or only to its representation in the computer system. In an electronic network setting, an item or product may include a digital content item or a packet or group of packets of data for transmission from a first electronic device to a second electronic device.

FIG. 1 is a pictorial diagram depicting a data flow of planning parameters being provided to a network planning server that generates an optimized network plan. The planning parameters 102 may include a fleet identifier for which a network plan will be generated. A fleet may include one or more pieces of equipment that can be used to transmit items through the network. When a fleet includes more than one piece of equipment, the equipment included in the fleet are interchangeable having similar type (e.g., airplanes), capacity, and transmission qualifications (e.g., can be operated by the same user, can be operated in the same territories, etc.).

Examples of equipment include routers, broadcast towers, vehicles, aircraft, mobile drive units, or automated item sorters.

The planning parameters 102 may include a planning period which identifies a period of time the network plan should cover. For example, it may be desirable to generate a plan that covers one week. The planning period may be specified in absolute terms by identifying the specific week for which to plan. The planning period may be specified in relative terms. For example, if the planning period is set to "one week," the system may generate a one week network plan starting a predetermined date in the future (e.g., two months from the current date). For future planning periods, the system may identify network plans that include new equipment or other network resources. In such systems, the ability to add resources to the network may be limited by the planning period. For example, if planning for one week into the future, the system may identify network plans using the currently available resources. However, if planning for a year or two into the future, it may be possible to acquire new equipment for inclusion in the network plan. In such instances, the network plan may include an indication of resources to add or remove from the network.

The planning parameters 102 may be included in a message received from a planning device 110 by the network planning server 120. The planning parameters 102 may be received by the planning device 110 through a user interface specifically configured to receive, transmit, and present network planning information. In some implementations, the planning device 110 may be associated with a routing system such as an autonomous vehicle routing system, air traffic routing system, or packet network routing system. In such instances, the routing system may periodically request a network plan from the network planning server 120. The period requests may be scheduled, triggered by network events (e.g., equipment outage, environmental changes such as severe weather, acquisition of equipment, decommissioning of equipment, alteration to equipment (e.g., increased capacity, transmission distance, etc.), or the like), or other factor detectable by the planning device 110.

The network planning server 120 may request network resource information based on the planning parameters from a network resource information server 180. The request may identify one or more characteristics of the equipment or other network resources that are available for inclusion in the network plan. A characteristic may be a static property of the network resource such as capacity, range, or operator restrictions. Conversely, a characteristic may be a dynamic property such as expected demand for the resource. The expected demand may be generated for the resource upon request such as through demand forecast modeling.

A network resource may include equipment which may be associated with a fleet. A network resource may include facilities such a gateways, transfer stations, or fulfillment centers. A gateway may refer to a facility that can receive an item for transmission. A transfer station may refer to an intermediate facility along a transmission route that can receive and re-transmit the item. A fulfillment center may refer to a facility that can transmit the item to its final destination. Typically, once an item leaves the fulfillment center it may be deemed to have left the network. A route may identify a path through the network from an originating facility (e.g., fulfillment center) to a destination facility (e.g., sort center).

The network resource information server 180 may transmit the network resource information in response to a request from the network planning server 120. In some implementations, it may be desirable to include third party resource information such as capacity available on equipment of a third party that can be used to transmit an item. In such instances, the network resource information server 180 may communicate with a third party network resource information server 185 to obtain resource information about third party network resources. For example, an item may be transmitted using equipment associated with the information processing system 112 or be offloaded to a third party transmission service provider. In some instances, the third party may provide a more efficient transmission than the transmission that can be offered by the equipment associated with the information processing system 112. Thus, the network planning may consider such third parties when allocating resources within a network plan.

The planning parameters 102 and the network resource information may be used as inputs for network planning server 120 to develop a network plan. Using these inputs, a network plan may be generated such as via an optimization model. For example, a network may include limited transmission vectors each having constraints such as a capacity, transmission speed, resources required to transmit, etc. The schedule may include assigning specific equipment to legs of a transmission route at specific times, as well as the assignment of specific items to be transmitted to specific legs. A cost may be associated with a route, selected equipment, and item transmission. The model may provide a schedule that minimizes the cost. Cost may be measured as time, resources, distance, processor cycles, power consumption, network hops, throughput, bandwidth, or other network or resource property measurable during transmission of an item.

The model may include or generate a set of gateway-to-gateway demands. A gateway-to-gateway demand may specify origin and destination gateways, the critical pull time (CPT), the critical entry time (CET), and the forecast demand amount as both the number items and their expected volume (e.g., in cubic feet, megabytes, or other volume measurement). A critical pull time is the time at which a transmission must leave a location to maintain the network plan. A critical entry time is the time at which a transmission must arrive at a location to maintain the network plan. One expression of each such demand from gateway a to gateway b of size v is:

$$\mathrm{dmd}(a,b,\mathrm{CPT},\mathrm{CET},v)$$

A demand can be satisfied by any or all of a set of item transmissions. The possible transmissions include direct transmissions, transmissions through a hub (e.g., where CVG is currently the only defined hub though multiple hubs are allowed), or transmissions through intermediate nodes that are not network hubs, but rather network hops. Any demand amount that cannot be transmitted using the planned network may be assumed to be transmitted via third-party network equipment. The model may account for the costs of third-party network utilization when planning the network. In general, each possible transmission variable represents that amount of the demand carried from station x to station y, departing at dep and arriving at arv, denoted as:

$$\mathrm{xmt}(d,x,y,\mathrm{dep},\mathrm{arv})$$

In one aspect, possible departure times (e.g., on the hour transmissions) greater than or equal to the CPT provided the transmission arrives on before the CET. Transmissions via the hub may also include hub processing time delays. If transmission durations vary by equipment, then a given departure time may correspond to multiple arrival times.

Thus, multiple non-stop and hub-connected transmissions may need to be created such that the transmission could be carried by equipment for a leg of a transmission route that may be currently assigned to different equipment.

As mentioned, transmissions through the hub may have to wait between their inbound and outbound transmissions. Using the analogy of airplanes, this wait may be referred to as ground time. Ground time may be required to account for processing time at the hub (e.g., sorting, queuing, coding, decoding, loading, unloading, etc.), or just until equipment becomes available to transmit the item from the hub. Therefore, for each demand d, the following transmission ground variables may be generated, $$xmtgnd(CVG,t,d)$$

for each time interval t. This demand can also be extended to multiple hubs.

Once the possible transmissions are defined across demands, corresponding transmission equipment variables may be generated. For example, one transmission equipment variable may be generated for each possible departure time and equipment combination. Note that multiple transmissions across various demands may define the same transmission equipment variable combinations. A binary decision variable may be identified for the transmission from gateway a to gateway b, departing at time dep, on equipment eqp, denoted as:

$$xmteqp(a,b,dep,eqp)$$

Note that linking constraints may be added to relate each such transmission equipment variable to their set of defining transmission variables.

The block time (e.g., time to transmit from a first point to a second point) for each gateway pair a-b may vary based on the equipment used to transmit the item. Furthermore, an equipment included in a transmission route may be associated with a load delay may represent the time required to prepare the equipment for transmission (e.g., load the equipment, unload the equipment). This delay may be added to the block time to calculate when the aircraft is available for its next flight.

It sometimes may be desirable to include empty transmissions in the schedule that do not correspond with any items in order to position equipment where it will be needed to carry future demand. Some, though not all, of the possible empty legs may be generated and added to model. Since these do not correspond to any demand transmissions, no linking constraints may be generated nor is the load delay added to their block time. Note, however, that some transmissions created to carry demand may end up in the solution as empty without any of their corresponding transmission variables in the solution even though they include the load delay in their block time.

Equipment may wait between transmissions. To account for the wait time, ground arc variables may be associated with each station s, for each time interval t, and for each equipment e. These variables may be expressed as:

$$gnd(s,e,t)$$

Another input to the model is the set of possible equipment configurations (e.g., fleets), where each such configuration defines a set of operational characteristics, such as a total capacity for the equipment included in the fleet, and an available number of distinct transmission equipment. For example, when the equipment includes aircraft, a flight-specific portion of the model can be viewed as the well-known fleet assignment model (FAM) on a grossly over-built schedule of departures (connecting all the nodes/gateways to each other every hour to build a fully-connected network). The fleet assignment model may be applied to implementations other than aircraft such as vehicle network planning, data network planning, or other transmission networks.

Using the above variables, the solution representing a network plan may be expressed as a mixed integer programming problem. However, it may be unrealistic to expect the model to be unconstrained. As such, the network planning may also include consideration of planning constraints.

The network planning server 120 may request one or more planning constraints from a constraint selection engine 130. The system may include a variety of constraints which may or may not be applicable to the network being planned. The constraint selection engine 130 may identify those constraints which should be considered for the networking being planned. The request may include information from the received planning parameters 102 such as the planning period or fleet identifier. The request may include information about a resource received from the network resource information server 180. The request may include information generated or obtained by the network planning server 120. For example, if the resources identified for the planning may include equipment of one type (e.g., aircraft). In such instances, constraints specified for another type of equipment may not be relevant (e.g., packet network routers) and can be excluded based on equipment type information associated with the constraints.

The request may include temporal information identifying one or more planning dates (e.g., the time period to which the forecast may pertain). The information included in the request may be used, at least in part, to select one or more planning constraints, for example, a planning constraint to be implemented at a future date. In such instances, any plans prior to the future date need not consider the constraint while any planning for after the future date may need to consider the planning constraint. Planning constraints may constrain the network or a network resource (e.g., equipment) of network. One example of a planning constraint for a network may be total transmission volume which may be specified as a number of items transmitted for a period of time. One example of a planning constraint for a network resource may be load capacity for a vehicle which may be specified as a total cubic footage or gross weight of items that can be transmitted using the vehicle.

The request may include geographic information identifying one or more planning locations (e.g., an area to which the network may provide transmission service). The information included in the request may be used, at least in part, to select one or more planning constraints. For example, a planning constraint may be associated with certain geographic regions. In such instances, any network planning outside the geographic region need not consider the planning constraint.

Planning constraints may be stored in a planning constraint data store 140. The planning constraints may be indexed to facilitate efficient identification and retrieval of relevant planning constraints by the constraint selection engine 130. For example, the planning constraints may be indexed by equipment type or geography such that planning constraints for an equipment type or specified area can be quickly retrieved based on an identifier of the equipment type or spatial information identifying the location.

Example Planning Constraints—Equipment Coverage Constraints

As noted earlier, for each defined combination of origin and departure stations a and d, and departure time t, we create transmission equipment variables for every equipment in the fleet e. However, it may not be possible to have more than one such transmission with a given piece of equipment in the solution since transmissions must be unique by station pair and departure time. Thus, the following coverage constraint for each (a,b,t) combination may be applied.

$$\sum_{\forall e} xmteqp(a, b, t, e) \leq 1$$

Example Planning Constraint—Flow Constraints

Equipment flow constraints may be defined at each station s and fleet e for each time interval t to balance equipment arrivals with equipment departures including any equipment on the ground (e.g., waiting at a station). The equipment flow constraint generalize the notion that a network resource is not available to service a future transmission until completion of an initial transmission. The availability may also be constrained by ground time needed to load and unload the equipment. An equipment flow constraint may be expressed in the following form:

$$gnd(s, e, t) + \sum_{\forall a, dep+dur=t} xmteqp(a, s, dep, e) = gnd(s, e, t+1) + \sum_{\forall b} xmteqp(s, b, t, e)$$

for all times t∈[1,T], for all stations s, and for all equipment types e. Note that for t=T, gnd(s,e,1) instead of gnd(s,e,T+1) may be specified in order for the constraint to "wrap around" and so represent a repeating, single day.

Similar flow constraints are also defined for demand transmissions at the hub, as well as for transmissions at other stations. However, these constraints may not consider fleet capacity and do not wrap around since the transmissions are intra-node transfers rather than transmissions between different network locations.

Example Planning Constraint—On Ground Constraints

Time intervals may be specified by station and fleet during which some number of equipment must be on the ground. For example, it may be advantageous to limit a total amount of time that equipment is in transit to help control traffic. One way to implement such a constraint is to include times or quantities of network resources that must be idle in the network plan. Idle time may be, for physical transmission systems, time when the network resource is not scheduled for transmissions. Idle time for a data network may be time when the network resource is offline or restricted from transmitting and receiving data. This constraint may be included by setting a lower bound on the ground arc variables gnd(s,e,t) that fall within these specified intervals.

Example Planning Constraint—Equipment Count Constraints

The number of available equipment for each fleet may be accounted for and controlled. One approach is to count all of the equipment on the ground and in transit at some common predetermined time (e.g., midnight, noon, or 5 pm coordinated universal time (UTC)). An equality constraint may be assigned for each fleet e to define an equipment count variable AC(e). These variables may define minimum and maximum equipment limits. Any limits by fleet can be implemented by defining limits on the corresponding AC(e) variable. Limits over the fleets, specified by a minimum equipment and maximum equipment planning parameter for example, may define equipment count constraints as follows:

$$AC(e) = \sum_{\forall s} gnd(s, X, e) + \sum_{\forall a,b,dep} xmteqp(a, b, dep, e)$$

$$\min(e) \leq AC(e) \leq \max(e)$$

$$MinEquip \leq \sum_{\forall e} AC(e) \leq MaxEquip$$

Minimum equipment requirements can result in somewhat strange results since the model may satisfy these requirements by simply parking equipment at some station(s) without actually using it to process items. Alternatively, the equipment may be not be used for transmissions, which can result in potentially poor utilization and excessive, sparse routes. A further advantage of the described features is to identify these under-utilized areas and either drive more traffic to defray cost from more expensive or busy routes or reduce further costs related to maintaining equipment that is no longer serving a useful purpose in the network. One way to reduce the cost for the unneeded equipment is to offer the capacity of such equipment to other parties for transmitting items.

Example Planning Constraint—Routing Limits

In general it is possible to end up with routes that contain too many transmission legs, which may not practical operationally. For example, it may be desirable to provide a network that includes routes which do not contain more than 3-4 legs to travel from an originating location to a destination location. This limitation may be implemented by defining constraints on the average block hours per fleet, avg. For example, in the case of aircraft, the block minutes per fleet may be set to 10 or 12 hours. If dur(a,b,e) represents the block hours (duration) of a transmission from station a to b on fleet e, then the following constraint may be applied for each fleet e:

$$\sum_{\forall e,a,b,t} xmteqp(a, b, t, e) * dur(a, b, e) \leq avg$$

Example Planning Constraint—Departures Per Station

Due to station capacity, the maximum number of total departures per station may need to be limited. For example, in an air network, a given airfield may provide a fixed number of departures per day. The scheduling of the departures may be flexible, but the total number of departures may be constrained to the fixed number. A similar constrain may be applicable to a hub which may similarly limit the total number of outbound transmissions for a period of time. These limits may be expressed as:

$$\sum_{\forall e} xmteqp(a, b, t, e) \leq d(a)$$

for each station a, where d(a) is the specified maximum for the station.

Example Planning Constraint—Maximum Packages Processed at the Hub

Items arriving at a hub, regardless of the equipment used to transport the item to the hub, may go through sortation processing. There may be a limit on the number of item that can be processed per hour. A cumulative, daily limit at the hub may also be provided. A time t may be specified, such as by input to the modeling process or through a configuration accessible to the modeling process. The time may represent a particular hour or other moment in time. The number of inbound transmissions that effectively arrive at t (given the unload delay) as well as all outbound transmissions that leave at t may be compared to the limit due to sortation processing. An overall maximum at the hub may be represented as a sum of transmissions across all times t at the hub.

Example Planning Constraint—Fixed Legs

Another constraint which may be specified to the network planning is inclusion of specific legs in the network. For example, certain legs may be identified that must be included in the planned network. These fixed legs may specify an origin station and a destination station, as well as a departure time and equipment for transmitting between the origin and destination. For example, it may be desirable for reasons unrelated to item transmission, to include at least one transmission leg between two servers such as to retain a communication link between the two servers. The departure time for a fixed transmission may be specified in local time at the origin station. In such instances, if departures are defined in two hour increments, then a departure time may not directly correspond to any of the scheduled transmissions. In this case, the network planning may automatically look at the next hour to find the transmission instance.

Example Planning Constraint—Station Prohibits

Another constraint which may be specified to the network planning is prohibitions on certain equipment at a particular station. For example, in aircraft network planning, certain airports may not have sufficient runway or loading facilities for certain models of aircraft. This constraint may be implemented structurally by disallowing the scheduling of such transmissions to the specified station which include prohibited equipment.

Example Planning Constraint—Station Curfews

Some stations impose curfews on departures, arrivals, or both. A curfew may be included to account for environmental concerns (e.g., noise) or availability of equipment (e.g., server maintenance downtime). Through user input or via configuration, the planning system or method may receive information specifying a station, curfew type, and time interval. Like station prohibits, this constraint may be implemented structurally by disallowing the creation of any transmissions that would violate a curfew.

Example Planning Constraint—Demand Coverage

As noted previously, each demand for transmission can be covered by one or more transmissions using network resources of the system, or it may be satisfied by a third-party network. For example, a package may be delivered using a delivery agent of the system or the package may be provided to a third-party contractor for delivery. The total demand covered by third-parties may be given by the sum of those transmission variables whose destination is the destination of the demand. This can prevent double counting transmissions through the hub as well as intra-facility transmissions. In some implementations, any portion of the demand not carried by the planned network can be offloaded to a third-party service, which is expressed below as the variable third(d). One expression of the demand coverage constraint, where v(d) is the total demand amount (number of packages), is:

$$\sum_{\forall dep} xmt(d, a, b, dep) + \sum_{\forall j, dep} xmt(d, a, CVG, dep) + \text{third}(d) = v(d)$$

Note that transmission variables for intra-facility transmissions may not be included as part of the demand coverage constraint.

Example Planning Constraint—Total Transmission Demand Coverage

When planning a network, it may be desirable to control the percentage of the total transmission demand that is carried by the network. For example, to mitigate the risk of network failure, a portion of the total transmission demand may be offloaded to a third-party network. One expression of total transmission demand may be $TD=\Sigma_{\forall d} v(d)$ and [tgt Min, tgt Max] may represent a target coverage range (e.g., minimum and maximum). The target range may be specified an input parameter or configuration value provided to the network planning system or method. A constraint may be added to the modeling to ensure that demand is within the desired range. One expression of the demand coverage constraint is:

$$\sum_{\forall d} \text{third}(d) \le (1 - tgtMin) \cdot TD$$

$$\sum_{\forall d} \text{third}(d) \ge (1 - tgtMax) \cdot TD$$

Note that these constraints each include a tolerance variable to make the constraint less rigid so that they do not create infeasible problems. A tolerance variable may define variance from a target minimum or target maximum to provide flexibility in the planning.

Example Planning Constraint—Minimum Transmission Types

As noted above, a transmission may be accomplished through a direct point-to-point transmission, transmission via a hub, or intra-node transmission. It may be desirable to constrain the total number of transmissions of one or more of these types in a planned network. In such implementations, the model may plan to transmit some quantity of the demand through a hub, or via intra-node transmissions. The quantity of demand may be specified as a user input or via a configuration made available to the modelling process. Similar to the demand coverage constraints, transmission type constraints may aggregate the inbound transmissions to a demand destination and compare the aggregated demand to the desired percentage of the total demand. A tolerance variable defining variance from a target minimum or target maximum may be included to provide flexibility in the planning.

Example Planning Constraint—Transmission to Equipment Constraints

A transmission flow variable can only be active if a corresponding equipment flow variable at the same time is also active to participate in the transmission. Furthermore, any capacity constraint of the equipment may also be considered and, in some implementations, may not be violated. These requirements may be represented by the following constraints:

$$\sum_{\forall e} cap(e) * \mathit{flt}(a, b, dep, e) \geq \sum_{\forall j} \mathit{xmt}(d, a, b, dep), \forall\, a, d, dep$$

In some implementations, the application of the transmission to equipment constraints may dynamically adjust other variables included in the modeling. For example, some flights corresponding to shipments may not be able to be identified during the network planning process. This may happen due to the more exhaustive feasibility analysis that is done during flight creation. In this case, variables are not part of any such constraint may be set to 0 to reflect the lack of need for the associated constraint.

Example Planning Constraint—Location-To-Location Demand

The demand defined in the model may identify gateway-to-gateway demand. However, the true required demand may be the demand between ground locations such as fulfillment center to sort center which may be connected to more than one gateway. These set of possible connections may be specified by the network topology server. The location-to-location demands may be known in the model as node demands. For each node demand a set of all possible gateway-to-gateway connection combinations may be generated, where each combination in turn defines a possible gateway-to-gateway demand for defining the model.

Each node demand may generate a set of gateway-to-gateway demands. The CPT and CET for these demands may be derived from the CET and CPT for the node demand by adjusting them for the connection transit times. In some implementations, considering the location-to-location demand may include defining a single demand coverage constraint for each node demand and which, collectively, will cover all of the gateway demands.

The network planning server 120 may generate a network plan based on the planning parameters 102, the network resource information received from the network resource information server 180, and any planning constraints provided by the constraint selection engine 130. The network plan may include an allocation of network resources to one or more transmission paths from an origination location to a destination location, equipment type needed for the transmission, and a schedule of transmission departure and arrival times. In some implementations, the network plan includes metrics characterizing the plan such as a load factor indicating the utilization of available capacity by the network plan.

The network planning server 120 may generate the network plan by finding an optimal solution to a model given the identified planning constraints. For example, the model may include an objective function for which an optimal solution is identified given the applicable constraints. There may be several inputs to the objective function including fleet costs, transmission costs, and demand costs which. Since these inputs represent costs, the objective function may be solved as a minimization problem. The model may receive as inputs an allocation of a network resource to a transmission leg of the network plan for a transmission demand via the network and a constraint identifying a resource constraint or network constraint for transmitting the item. The model may generate cost information as an output. The cost information may indicate a cost for transmitting the item along the transmission leg using the allocation of the network resource. A transmission leg may identify an origin location and a destination location and, in some instances, a time for transmitting between the locations.

Transmission costs may identify a cost to transmit between two locations. For example, the cost for a flight includes the sum of the block and fuel costs, both of which depend on the length of the flight, and a fixed per flight cost. It may also include airport costs from both the origin and destination stations. In a packet network implementation, the transmission costs may include a network transmission fee, energy consumption, a bandwidth consumption, or other resource utilized for the transmission. A fleet cost may represent a total cost for each fleet of equipment in the solution. The fleet cost may be generated by aggregating ownership costs and other fixed costs for each item of equipment (e.g., network resource) included in the network plan. A demand cost may identify a per item cost specified for transmitting an item via the planned network and for transmitting via third-party carriers. These two costs can be specified for each location-to-location demand. Other cost inputs that may be included in the model include small costs on some variables, particularly ground arcs, to discourage the unnecessary presence of these variables in the solution and partly to reduce degeneracy and improve performance. In some implementations, the model may include some costs on various tolerance variables that are used to soften some constraints and prevent an infeasible solution to the objective function.

It will be appreciated that in some implementations, the inputs to the objective function may be stated as benefits. In such implementations, the objective function may be solved as a maximization problem. Equation (1) provides one expression of an objective function that may be solved whereby the network plan associated with the solution identifies an allocation for one or more resources within the network. Equation (1) shows a mixed integer program (MIP) that may be used for network planning by solving the MIP to minimize the cost. The solution may be identified subject to the planning constraints provided by the constraint selection engine 130. The example of Equation (1) is stated in terms of a physical item shipping network including aircraft as the network resource (e.g., equipment), but may be applied for other equipment or network types.

$$\sum_{\forall l,p} \mathrm{Cost}_N(l, p)\, f(l, p) + \mathrm{Cost}_{3P}(p)(\mathit{Tot}(p) - f(l, p)) + \sum_l \mathit{VCost}_{l_e} F(l) + \sum_e \mathit{FCost}_e\, A(e) \quad \text{EQUATION (1)}$$

where the planning parameters include:
$v_t$: gateway v at time t;
p: point-to-point shipment p;
Tot(p): total amount of demand p;
$N_e$: number of equipment e;
$Cap_e$: capacity of equipment e;
$FCost_e$: fixed costs (e.g., ownership) of equipment e;
$VCost_{l_e}$: variable costs (e.g., fuel, block hour) of equipment e on leg l;
$Cost_N(l,p)$: cost rate of shipping demand p on leg l via network; and
$Cost_{3P}(p)$: cost rate of shipping demand p via third party;
and where the decision variables being solved for include:
F(l): binary indicator of whether leg l is in flight schedule;
f(l,p): package flow (via network) of shipment p along leg l;
G(s,e,t): integer ground plane arc for each station s, aircraft e, and time t;

g(s,p,t): ground arc for station s at time t for shipment p; and

A(e): total aircraft used for aircraft e.

After generating a network plan, the network plan may be transmitted from the network planning server 120 to the planning device 110. The transmission may include a message that initiates a display of a user interface to present the network plan. In some implementations, the transmission may include information about the constraints or planning parameters used to generate the network plan. In some implementations, the transmission may cause display of a map of the network and the associated equipment, transmission departure times, transmission arrival times, and the like.

The network plan transmitted from the network planning server 120 may be a one-time transmission, such as in response to receiving the planning parameters 102. In some implementations, it may be desirable to monitor the network resource information server 180 or the constraint selection engine 130 to identify updates in the network resource information or the planning constraints used to generate the network plan. In such instances, upon detecting an update to the planning constraints or network resource information, the network planning server 120 may generate a revised network plan. If a revised network plan differs from an original network plan or the difference is above a threshold, the network planning server 120 may initiate transmission of a message to the planning device 110 that received the original network plan. In some implementations, the allocation for a resource may be periodically generated and, if the difference between the allocation in the network plan transmitted to the planning device and a revised allocation exceeds a threshold, the network planning server 120 may initiate transmission of a message to the planning device 110 that received the original network plan.

For example, the network plan may be stored by the network planning server 120 along with contact information for the planning device 110 (or user associated therewith). Using stored contact information stored, the network planning server 120 may transmit a message including the revised network plan to the planning device 110. In some implementations, the threshold may include a number of scheduled routes that change or a number of changes in equipment assigned for a route. In such implementations, it may be tolerable to avoid applying a new network plan for the entire network if a predetermined number of changes is below the threshold. But if more than the predetermined number differ, it may be desirable to reconfigure the network in accordance with the revised network plan.

Figure 2:
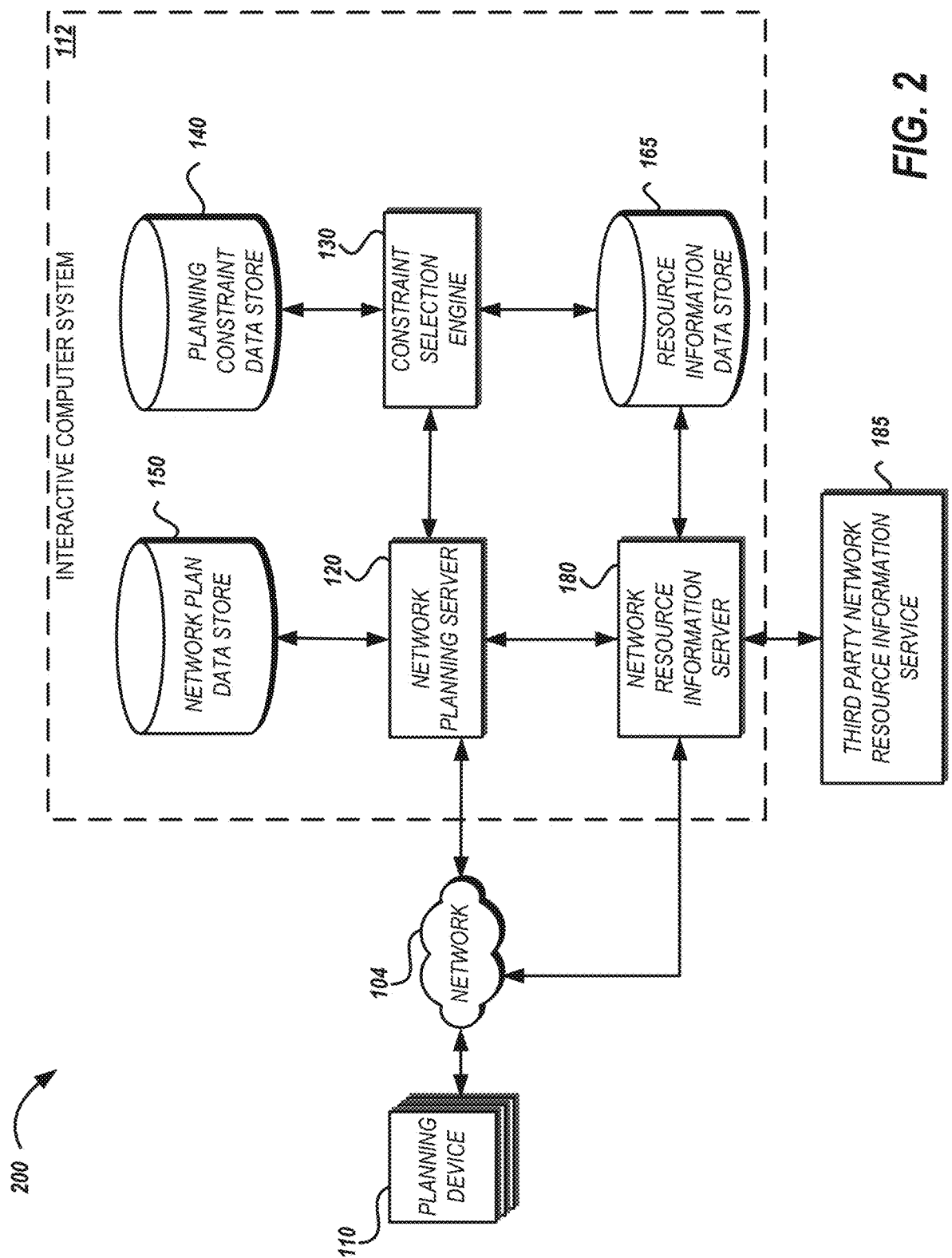
FIG. 2 is a block diagram depicting an illustrative operating environment for generating an optimized network plan.

FIG. 2 is a block diagram depicting an illustrative operating environment for generating an optimized network plan. In the environment shown in FIG. 2, a user of the environment 200 may include a planning device 110 to communicate with the network planning server 120 via a communications network 104. The planning device 110 can include, for example, computing devices, such as desktop computers, laptop computers, tablets, personal digital assistants (PDAs), mobile phones, electronic book readers, other wireless handheld devices, set-top or other television boxes, media players, video game platforms, kiosks, glasses or other wearable devices, or any other device with a hardware processor.

The communications network 104 may be any wired network, wireless network, or combination thereof. In addition, the communications network 104 may be a personal area network, local area network, wide area network, cable network, satellite network, cellular telephone network, etc. or combination thereof. For example, the communications network 104 may be a publicly accessible network of linked networks, possibly operated by various distinct parties, such as the Internet. In some embodiments, the communications network 104 may be a private or semi-private network, such as a corporate or university intranet. The communications network 104 may include one or more wireless networks, such as a Global System for Mobile Communications (GSM) network, a Code Division Multiple Access (CDMA) network, a Long Term Evolution (LTE) network, or some other type of wireless network. The communications network 104 may use protocols and components for communicating via the Internet or any of the other aforementioned types of networks.

The planning device 110 may present a network planning interface that includes control elements to receive data inputs for network planning. Example data inputs may include item data such as the item data 102 shown in FIG. 1. The user interface may include a control element that, when activated, causes submission of a message requesting a network plan to the network planning server 120. The request may include a value indicating whether the request is a one-time request or an ongoing request (e.g., subscription) for network plans. If the request is for a one-time network plan, the network planning server 120 may generate a network plan as discussed with reference to FIG. 1 and in further detail below. The generated network plan may then be returned in a response message to the request to the planning device 110. If the request is for ongoing network plans, the network planning server 120 may save information identifying the planning device 110 and/or user requesting the network plans. As network plans are generated, the network planning server 120 may transmit the network plans to the planning device 110 or another device associated with the user requesting the network plans. In this way, the planning device 110 may subscribe to real-time updates to the network plans based on the most recent models and inputs (e.g., weather predictions, equipment status, transmission conditions, etc.).

The requests received by the network planning server 120 and/or the network plans generated may be stored in a network plan data store 150. The network plan data store 150 may be a specially architected memory device configured to store network plans. The information may be indexed by one or more of: an identifier of the planning device (e.g., IP address, media access control (MAC) address, mobile equipment identifier (MEID), etc.), an identifier of the network being planned, an identifier of the planning parameters provided to generate the network plan, or a user identifier (e.g., user name, user ID, etc.) associated with a network plan. The network plan data store 150 may store a generation date associated with a network plan. The generation date may indicate when the network plan was generated. The generation date may be used to schedule subsequent processing for a network plan subscription. For example, the network planning server 120 may include a threshold indicating how often the network planning server 120 should determine if new models or inputs are available. If the amount of time elapsed since the generation date exceeds the threshold, the network planning server 120 may generate a revised network plan.

Whether generating a new network plan or revising a network plan, the network planning server 120 may communicate with the constraint selection engine 130 to obtain one or more planning constraints. The planning constraint data store 140 may be included to store the planning constraint information such as the constraints discussed with reference to FIG. 1. As shown in FIG. 2, the constraint selection engine 130 may also receive information from the resource information data store 165. The resource information data store 165 may include information about different resources that may be included in a network plan.

As shown in FIG. 2, the resource information data store 165 is included in the interactive computer system 112. However, it will be appreciated that the network planning elements (e.g., network planning server, constraint selection engine, associated data stores, etc.) may be implemented separately from but in data communication with the resource information data store 165.

As discussed with reference to FIG. 1, the network planning server 120 may communicate with the network resource information server 180 to obtain information regarding available resources for inclusion in a network for transmitting an item from a first location to a second location. The network resource information server 180 may generate network resource information based at least in part on available resources identified from the resource information data store 165. For example, the resource information data store 165 may include equipment that may be grouped into a fleet.

The environment 200 is depicted in FIG. 2 as a distributed computing environment including several computer systems that are interconnected using one or more computer networks. The interactive computer system 112 could also operate within a computing environment having a fewer or greater number of devices than are illustrated in FIG. 2. Thus, the depiction of interactive computer system 112 in FIG. 2 should be taken as illustrative and not limiting to the present disclosure. For example, the interactive computer system 112 could implement various Web service components and/or peer to peer network configurations to implement at least a portion of the features or processes described herein.

Figure 3:
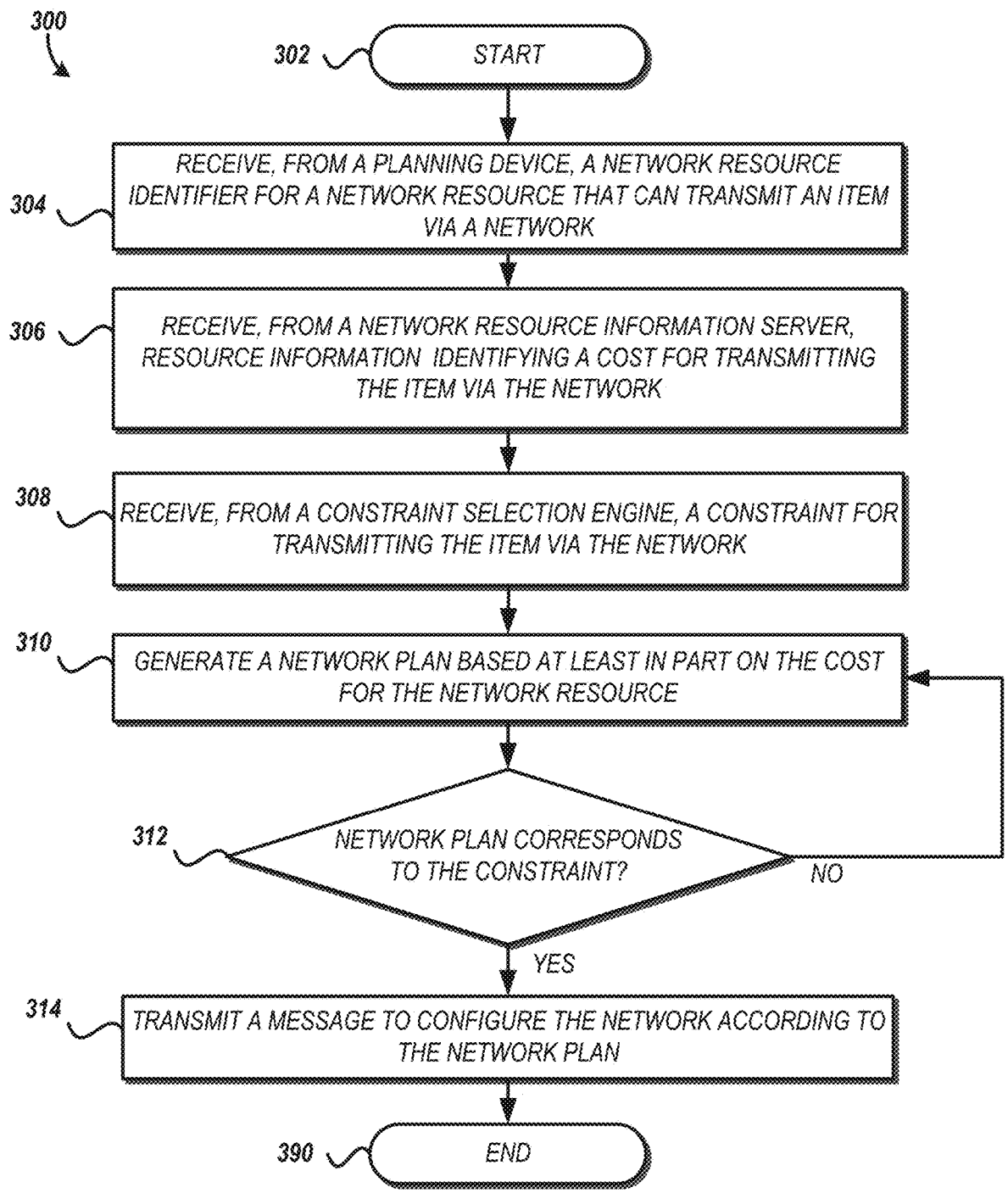
FIG. 3 is a flow diagram depicting an illustrative method of generating an optimized network plan.

FIG. 3 is a flow diagram depicting an illustrative method of estimating quantities of an item for respective fulfillment centers. The method 300 may be implemented in whole or in part by one or more of the devices described herein, such as the network planning server 120 shown in FIG. 1, FIG. 2, FIG. 4, or FIG. 5. The method 300 may generate a network plan based on the provided planning parameters and in consideration of the applicable constraints.

The method 300 begins at block 302. At block 304, a network resource identifier for a network resource that can transmit an item via a network may be received from a planning device. The network resource identifier may be included as a planning parameter for the network plan. In some implementations, the planning parameters may identify multiple network resources for which a plan may be generated. In some implementations, the planning parameters may reference a group of resources (e.g., a fleet of equipment) for which a network plan may be generated. The planning device may provide additional or alternative planning parameters such as a planning period. The planning period may identify a period of time during which the item will be transmitted via the network.

At block 306, resource information for the network resource identified in the in block 306 may be received from a network resource information server. The resource information may identify a cost for transmitting the item using the network resource. Some examples of such costs include transmission costs (e.g., resources utilized to transmit an item from one location to another location using the network resource), fixed costs representing the cost to maintain the network resource (e.g., cost of ownership, maintenance, servicing, etc.), or a transfer cost to load or unload an item from the network resource (e.g., aircraft may have costs associated with the speed, location, and form in which the aircraft can be accessed for loading items for transmission or retrieving items that have been transmitted). If a planning period is provided, the resource information may be identified for the specified planning period. For example, the method 300 may generate a network plan for a future date. At that future date, the cost to transmit items via a given network resource may differ from the current cost for the network resource. By accounting for the planning period, the relevant resource information at the time of actual transmission may be obtained such that the network plan may reflect the future conditions.

At block 308, a planning constraint may be received from a constraint selection engine. The planning constraint may identify a network constraint indicating a network level limit on transmissions. The network constraint may include a total volume constraint, a total cost constraint, or other measureable aggregate constraint for the network. The planning constraint may identify a resource constraint for a resource (e.g., equipment, fleet, facility, etc.) included in the network. The network resource constraint may identify a constraint on a particular network resource such as total volume of items the resource can transmit, time to transmit between locations, geographic limitations on where the resource may go (e.g., runway capacity, data security, etc.), or the like.

At block 310, a network plan may be generated for the network resource. Generating a network play includes allocating network resources to provide an expected level of transmission capacity for items. The network resources allocated may be associated with the network (e.g., in-network) or be provided by third parties. The allocation may identify at least one of: a time, a quantity, or a location for the network resource to transmit an item. The allocation may be expressed as a schedule of transmissions indicating what equipment is made ready to transmit from a first location to a second location beginning at a specified time.

The generation of the network plan may include receiving a model for generating the allocation. The model may be implemented as an objective function which can be solved by finding a solution that minimizes or maximizes a value such as a cost or throughput, respectively.

To improve performance of block 310, the model may be modified to plan the network based on a solution via linear programming relaxation. The following heuristic may be applied to convert the objective function to a form that can be solved using linear programming relaxation:

- If a particular fleet was not used in the relaxation, fix to zero the equipment variables that are assigned to this fleet.
- For node demand that is only satisfied by a third-party, fix to zero the transmission variables for the gateway demands that correspond to that demand.
- Fix to 1 binary equipment variables that are very close (e.g., within a threshold amount) to 1.

If any variables were fixed, the linear programming relaxation may be solved to identify the optimal network plan. This more restricted version of the problem may end up finding a solution that is somewhat inferior to the mixed-integer programming (MIP) solution to the original problem. However, the linear programming relaxation solution may be identified using fewer resources than the mixed-integer programming solution. Furthermore, because the LP solution is applied if variables were fixed, the size of the problem may be reduced to the extent that a solution can be found far more quickly than the MIP solution.

A solution using MIP may be generated using the latest LP relaxation solution as the best bound (e.g., a boundary allocation identifying an outer limit for a "best" solution). The MIP solution process may include the following two criteria to identify when to terminate searching for a solution simultaneously:

When a solution is found with a relative gap percentage less than the specified bound, where gap=(MIP−LP)/LP.

When the total solution time exceeds a specified planning run time (default=60 minutes), provided at least one MIP solution that has been found. Otherwise, continue processing until a first solution is found.

At block 312, the method 300 may determine whether the network plan generated at block 310 corresponds to the planning constraint received at block 308. For example, if the planning constraint is a network constraint, an attribute of the network expressed by the plan such as total transmission time or total transmission volume may be compared to the network constraint. If the network constraint indicates that the maximum transmission volume is below the total transmission volume, the determination at block 312 is negative and the method 300 may return to block 310 to generate another solutions. The determination at block 312 may be negative if the planning constraint is a resource constraint and the network resource to which the planning constraint applied (as allocated in the network plan generated at block 310) fails to meet the resource constraint. For example, consider the case where the resource constraint is that the network resource cannot transmit video packet data. In such instances, if the network plan generated at block 310 includes transmitting video packet data via the network resource, the determination at block 312 may be negative.

If the determination at block 312 is affirmative, then the network plan generated at block 310 complies with the applicable constraints. In such instances, the network plan may be deemed a "valid" plan and at block 314 a message may be transmitted to configure the network according to the network plan. For example, if the network is a packet data network, the message may include a forwarding table entry or a command to instantiate additional transmission queues for packet data between locations. If the network is a physical delivery network, the message may include transmitting routing information identifying a time for a vehicle to transmit items from a first location to a second location. In the case of aircraft, the message may include a flight plan. Once transmitted, the method 300 may end at block 390.

In some implementations, the network plan generated at block 310 may be compared to an existing network plan. This may identify areas where an existing plan may be improved by changing one or more network resource allocations. For example, a first allocation for a network resource within the network plan generated at block 310 may be compared to a second allocation for a different network plan. If the difference between the first allocation and the second allocation corresponds to a threshold, then the difference may be substantial enough to warrant reconfiguration of the network. In such instances, the transmission at block 314 may be condition upon the comparison between the difference and the threshold.

In some implementations, blocks 310 and 312 may be performed as a single block. For example, the model at block 310 may be an objective function that can be solved using linear programming with the specified constraints. Because the solution to the objective function in such instances includes the specified constraints, the determination at block 312 is part of the solution.

Figure 4:
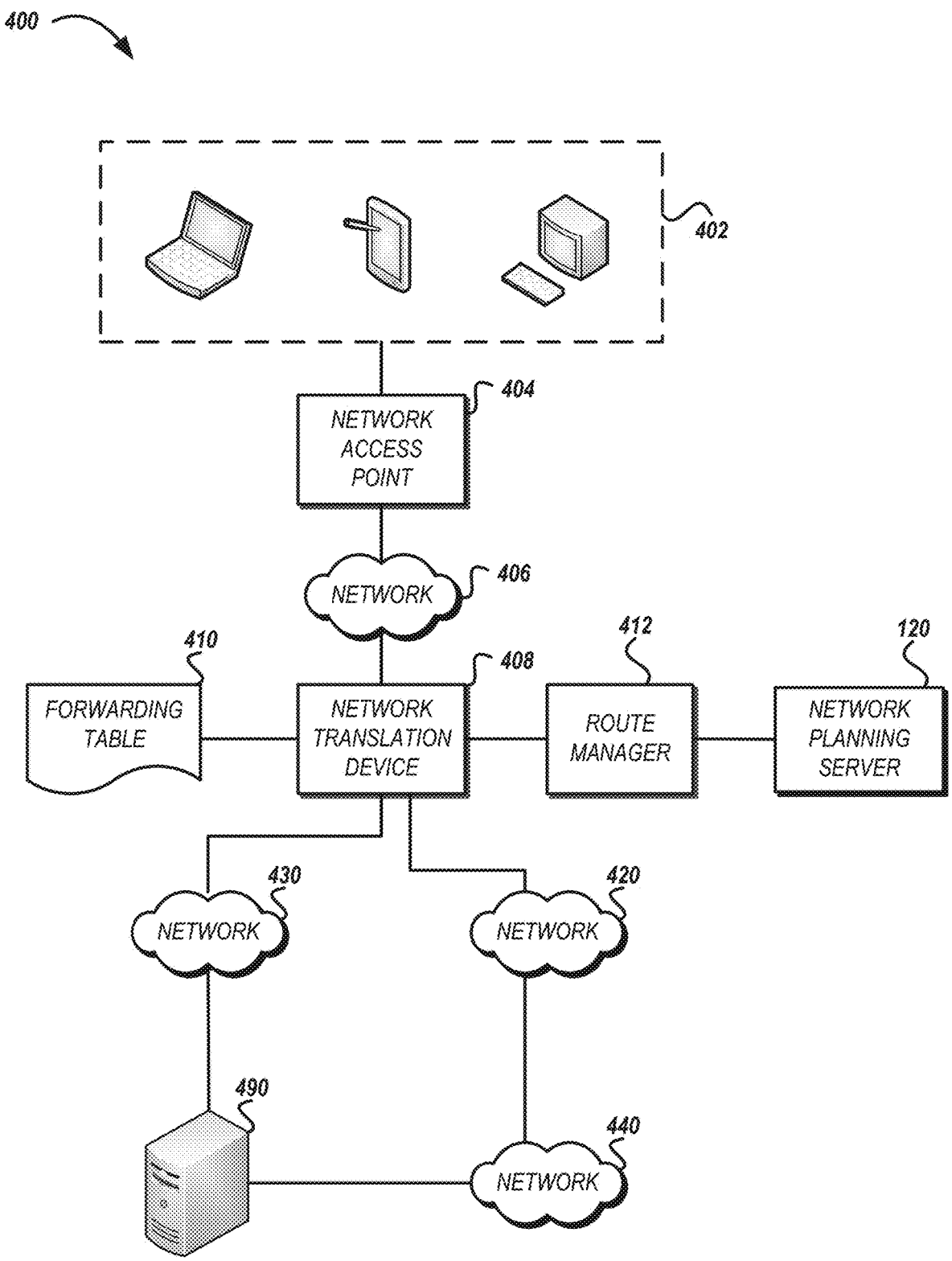
FIG. 4 is a block diagram depicting another illustrative operating environment for a network planning server.

FIG. 4 is a block diagram depicting another illustrative operating environment for a network planning system. The environment 400 of FIG. 4 represents a packet data routing network. The environment 400 may feature a collection of networks (e.g., network 406, network 430, network 420, and network 440). The networks may be the same type of network (e.g., wireless Long Term Evolution networks) or different types of networks (e.g., wired local area network and a wireless Global System for Mobile Communications network). The networks shown in FIG. 4 may be any wired network, wireless network, or combination thereof. In addition, the networks may be a personal area network, local area network, wide area network, cable network, satellite network, cellular telephone network, etc. or combination thereof. For example, the networks may be a publicly accessible network of linked networks, possibly operated by various distinct parties, such as the Internet. In some embodiments, the networks may be a private or semi-private network, such as a corporate or university intranet. The networks may include one or more wireless networks, such as a Global System for Mobile Communications (GSM) network, a Code Division Multiple Access (CDMA) network, a Long Term Evolution (LTE) network, or some other type of wireless network. The networks may use protocols and components for communicating via the Internet or any of the other aforementioned types of networks.

As shown, the environment 400 may schedule a transmission of an item from an access device 402 to a destination server 490. For example, a packet may travel from the network 406 to the network 430 and then to the destination server 490. An alternate route could be from the network 406 to the network 420 then to the network 440 and finally to the destination server 490. As with routing physical items, planning the network such that items are transmitted efficiently through the environment 400. It may be desirable to include the opportunistic network planning features described to help identify an optimal network plan by for the network resources included in the environment 400.

The environment 400 may include one or more access devices. The access device 402 may be an electronic communication device configured to transmit or receive packet data via the network 406. The servers and devices included in the environment 400 may include a packet data transceiver to receive or transmit packet data as described. Examples of such electronic communication devices include laptop computers, tablet computers, smartphones, desktop computers, servers, wearable devices (e.g., smartwatch or smartglasses), and the like.

The access device 402 may access the network 406 via a network access point 404. The network access point 404 may be a device configured to control connectivity of the access device 402 to the network 406. For example the network access point 404 may be a wireless access point that allows a Wi-Fi enabled access device to connect to the network 406.

The network 406 may include a network translation device 404. The network translation device 408 may be configured to direct communications addressed to destinations outside the network 406. The network translation device 408 may include a route manager 412 for determining a route for a data packet from the access device 402 to another location in the environment 400 such as a node associated with one of: the network 406, the network 430, the network 420, or the network 440.

In FIG. 4, the route manager 412 may receive routing information defining transmission routes via the network 430. The routing information may be generated by a network planning server using the route planning features described herein. The route manager 408 may implement the network plan by configuring one or more elements of the environment 400. For example, routing information may be added to a forwarding table 410 to direct data packets to at a specified time to a preferred destination. Adding routing information to the forwarding table 410 may include transmitting entries to the network translation device 408 that indicate where to send traffic (e.g., which equipment to transmit a data packet to) or when to send the traffic (e.g., buffering or other timing controls for the transmission). The network translation device 408 may receive different forwarding entries from the forwarding table 410 to implement different aspects of the network plan. For instance, data received from a first location (e.g., access device or network location) can be sent to the destination server 490 according to a network plan that includes transmission via the network 430, while another communication from a second location (e.g., a different access device or network location) may be the destination server 490 according to a network plan that includes transmission via the network 420 and the network 440. In some cases, packets with the same source or destination may be sent by different networks based on the associated virtual network. The entries included in the forwarding table 410 may be provided for specific data packets (e.g., destination, source, device type, packet data content type (e.g., text, video, audio, etc.)) or configured for all packets associated with the network 406 as indicated by the network plan.

In some embodiments, other networking equipment may be provided to identify and apply routing information. For example, a router or a network translation device can be configured to direct data packets along a preferred network route. Using blacklists, network traffic for a particular network can be allowed on one transmission path but blocked on others. The route manager 412 can send a control signal or message updating the blacklists to implement the network plan.

Other ways of communicating the routing information to plan transmissions through a network include: tagging of packets, such as by Multiprotocol Label Switching (MPLS); MAC stacking where a packet could have multiple MAC addresses, the first MAC address for a substrate component, such as a switch, and a second MAC address for a next component either on the "fast" or the "slow" transmission path; and using Network Address Translation (NAT) devices on both ends of a network in order to redirect traffic into the network, such as by spoofing or altering an destination address for an incoming packing and/or altering an the source address of an outgoing packet. In some embodiments, the route manager 412 may generate control signals or messages for transmission to the routing components to coordinate traffic according to the identified network plan.

In generating routes, the route manager 412 may receive planning parameters or network resource information from the routing control system 220. For example, the routing control system 220 may provide service to a specific geographic area. The routing control system 220 may provide information identifying the geographic area to facilitate identification of a network plan that is optimal for the geographic area rather than, for example, an entire network. However, in some implementations, the resources may be allocated throughout the network via the network plan without geographic limitations. In some implementations, the geographic limitations may be considered in the planning as a constraint based on current location of the network resource.

Figure 5:
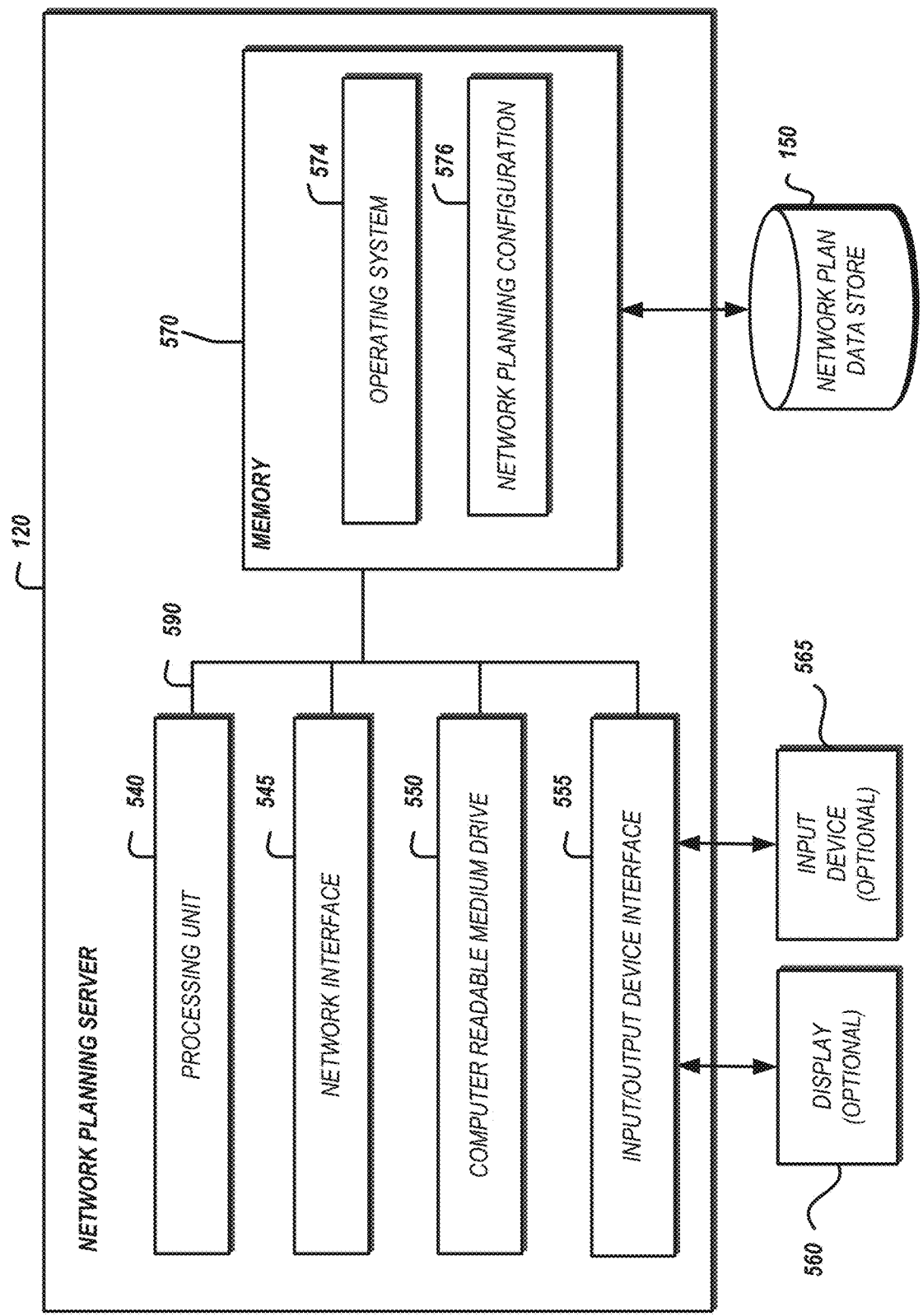
FIG. 5 is a block diagram depicting an illustrative architecture for a computing device for network planning.

FIG. 5 is a block diagram depicting an illustrative architecture for a computing device providing network planning services. The network for which the network planning services may provide a network plan may be a physical distribution network or a packet data network. The network planning server 120 can be a server or other computing device, and can comprise a processing unit 540, a network interface 545, a computer readable medium drive 550, an input/output device interface 555, and a memory 570. The network interface 555 can provide connectivity to one or more networks or computing systems such as the communications network 104 shown in FIG. 2. The processing unit 540 can receive information and instructions from other computing systems or services via the network interface 545. The network interface 545 can also store data directly to memory 570. The processing unit 540 can communicate to and from memory 570 and output information to an optional display 560 via the input/output device interface 555. The input/output device interface 555 can also accept input from the optional input device 565, such as a keyboard, mouse, digital pen, microphone, mass storage device, etc.

The memory 570 generally includes RAM, ROM, and/or other persistent, non-transitory computer readable media. The memory 570 can store an operating system 574 that provides computer program instructions for use by the processing unit 540 or other elements included in the computing device in the general administration and operation of the network planning server 120. The memory 570 can further include computer program instructions and other information for implementing aspects of network planning described.

For example, in one embodiment, the memory 570 includes a network planning configuration 576. The network planning configuration 576 may include thresholds or predetermined values to support the network planning operations, such as generating a network plan, described herein. The network planning configuration 576 may store specific values for a given configuration. For example, the threshold for determining when to check for resource or planning constraints may be specified as an absolute value (e.g., every day, week, 10 days, etc.). The values may be provided in a look up table indexed by one or more characteristics of the network plan or the information upon which the plan was generated (e.g., a planning parameter value or planning constraint).

Rather than storing express values for a particular configuration element, the network planning configuration 576 may, in some implementations, store information that allows the network planning server 120 to obtain a dynamically generated value for the given configuration element. For example, the identity of the default constraint engine may be specified as a network location (e.g., URL) in conjunction with username and password information to access the network location to obtain the network planning constraints that should be used by the network planning server 120.

The memory 570 may also include or communicate with one or more auxiliary data stores, such as the network plan data store 150. The network plan data store 150 may electronically store data regarding network plans generated by the network planning server 120, planning devices to notify in the event of a revised network plan, and the like.

The elements included in the network planning server 120 may be coupled by a bus 590. The bus 590 may be a data bus, communication bus, or other bus mechanism to enable the various components of the network planning server 120 to exchange information.

In some embodiments, the network planning server 120 may include additional or fewer components than are shown in FIG. 5. For example, a network planning server may include more than one processing unit 540 and/or computer readable medium drive 550. In another example, the network planning server 120 may not be coupled to a display (e.g., the display 560) or an input device (e.g., the input device 565). In some embodiments, two or more network planning servers may together form a computer system for executing features of the present disclosure.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a network planning server, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A network planning server can be or include a microprocessor, but in the alternative, the network planning server can be or include a controller, microcontroller, or state machine, combinations of the same, or the like configured to estimate and communicate network planning information. A network planning server can include electrical circuitry configured to process computer-executable instructions. Although described herein primarily with respect to digital technology, a network planning server may also include primarily analog components. For example, some or all of the network planning algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a network planning server, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An illustrative storage medium can be coupled to the network planning server such that the network planning server can read information from, and write information to, the storage medium. In the alternative, the storage medium can be integral to the network planning server. The network planning server and the storage medium can reside in an ASIC. The ASIC can reside in a user terminal. In the alternative, the network planning server and the storage medium can reside as discrete components in a user terminal (e.g., planning device).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein "receive" or "receiving" may include specific algorithms for obtaining information. For example, receiving may include transmitting a request message for the information. The request message may be transmitted via a network as described above. The request message may be transmitted according to one or more well-defined, machine readable standards which are known in the art. The request message may be stateful in which case the requesting device and the device to which the request was transmitted maintain a state between requests. The request message may be a stateless request in which case the state information for the request is contained within the messages exchanged between the requesting device and the device serving the request. One example of such state information includes a unique token that can be generated by either the requesting or serving device and included in messages exchanged. For example, the response message may include the state information to indicate what request message caused the serving device to transmit the response message.

As used herein "generate" or "generating" may include specific algorithms for creating information based on or using other input information. Generating may include retrieving the input information such as from memory or as provided input parameters to the hardware performing the generating. Once obtained, the generating may include combining the input information. The combination may be performed through specific circuitry configured to provide an output indicating the result of the generating. The combination may be dynamically performed such as through dynamic selection of execution paths based on, for example, the input information, device operational characteristics (e.g., hardware resources available, power level, power source, memory levels, network connectivity, bandwidth, and the like). Generating may also include storing the generated information in a memory location. The memory location may be identified as part of the request message that initiates the generating. In some implementations, the generating may return location information identifying where the generated information can be accessed. The location information may include a memory location, network locate, file system location, or the like.

As used herein a "user interface" (also referred to as an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), FLASH™, JAVA™, .NET™, web services, and rich site summary (RSS). In some implementations, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A network planning system comprising:
  a computer-readable memory storing executable instructions; and
  one or more computer processors in communication with the computer-readable memory, wherein the one or more computer processors are configured to execute the executable instructions to at least:
    receive, from a planning device, a network resource identifier for a network resource that can transmit an item via a network;
    receive, from a network resource information server, resource information for the network resource based at least in part on the network resource identifier, wherein the resource information identifies a transmission cost for transmitting the item using the network resource;
    receive, from a constraint selection engine, a resource constraint for the network resource based at least in part on the network resource identifier, wherein the resource constraint identifies a limitation in a functionality of the network resource for transmitting the item;
    receive, from the constraint selection engine, a network constraint for the network, wherein the network constraint identifies a network limitation of the network for transmitting the item;
    receive a model for generating an allocation of the network resource in a network plan that minimizes a cost of the network resource, wherein the allocation identifies at least one of: a time, a quantity, or a location for the network resource to transmit the item;
    generate the allocation based at least in part on the model and the transmission cost associated with the network resource;
    determine that the network plan corresponds to the network constraint;
    determine that the allocation of the network resource in the network plan corresponds to the resource constraint; and
    transmit a message to configure the network according to the network plan.

2. The network planning system of claim 1,
  wherein the one or more computer processors are configured to execute the executable instructions to at least:

determine that a factor included in the model is fixed for a period of time for which the network plan will schedule transmissions; and generate a relaxed allocation for the network resource based at least in part on the model including a fixed value for the factor and the transmission cost associated with the network resource;

wherein generating the allocation includes determining that the allocation of the network resource does not exceed the relaxed allocation.

3. The network planning system of claim 1,
wherein the one or more computer processors are configured to execute the executable instructions to at least:
compare the allocation of the network resource to another allocation of the network resource in another network plan; and
determine that a difference between the allocation and the another allocation corresponds to a predetermined threshold,
wherein transmitting the message is based at least in part on the difference corresponding to the predetermined threshold.

4. The network planning system of claim 1,
wherein the item comprises packet data,
wherein the network comprises a packet data network,
wherein the network resource comprises a packet data transceiver, and
wherein the message identifies a first location within the network from which the packet data transceiver will receive the item and a second location within the network to which the packet data transceiver will transmit the item.

5. A network planning system comprising:
a computer-readable memory storing executable instructions; and
one or more computer processors in communication with the computer-readable memory, wherein the one or more computer processors are configured to execute the executable instructions to at least:
identify a model for generating cost information for a network plan, wherein the model receives as inputs:
(i) an allocation of a network resource to a transmission leg of the network plan for a transmission demand via a network; and
(ii) a constraint identifying a limitation in a functionality of the network resource for transmitting an item and a network limitation of the network for transmitting the item, and
wherein the model provides as an output the cost information for the network plan, wherein the cost information indicate a cost for transmitting the item along the transmission leg using the allocation of the network resource;
request, from a constraint selection engine and based at least in part on the network resource, a planning constraint for the network plan;
generate, using the model and the planning constraint, a first cost for a first allocation of the network resource;
generate, using the model and the planning constraint, a second cost for a second allocation of the network resource;
determine that the first cost of the network resource is less than a second cost of the network resource;
generate the network plan based at least in part on the first allocation and the transmission leg; and
transmit a message to configure the network according to the network plan.

6. The network planning system of claim 5,
wherein the transmission leg includes a transmission time,
wherein the inputs to the model include a planned transmission time, and
wherein the one or more computer processors are configured to execute the executable instructions to:
identify a first transmission time for the network resource, wherein the first cost for the first allocation of the network resource is generated using the first transmission time;
identify a second transmission time for the network resource;
generate, using the model and the planning constraint, a third cost for the first allocation of the network resource at the second transmission time;
determine that the first cost is less than the third cost; and
generate the network plan further based at least in part on the first transmission time.

7. The network planning system of claim 5,
wherein the one or more computer processors are configured to execute the executable instructions to at least:
receive, from a planning device, a planning period identifying a period of time during which the item will be transmitted via the network;
request, from a constraint selection engine, at least one constraint that is applicable during the planning period,
wherein the constraint received from the constraint selection engine is applicable during the planning period, and
wherein the transmission demand indicates a demand level forecasted for the planning period.

8. The network planning system of claim 5,
wherein the cost includes a third-party cost for transmitting a portion of the transmission demand exceeding the capacity or constraint of the network via an alternate network.

9. The network planning system of claim 5,
wherein the model comprises an objective function, and
wherein the one or more computer processors are configured to execute the executable instructions to at least:
determine that a factor included in the model is fixed for a period of time for which the network plan will schedule transmissions;
generate a relaxed allocation for the network resource based at least in part on a linear programming relaxation solution for the objective function, wherein the objective function includes a fixed value for the factor; and
generate the first allocation and the second allocation based at least in part on the relaxed allocation.

10. The network planning system of claim 5,
wherein the one or more computer processors are configured to execute the executable instructions to at least:
compare the first allocation of the network resource in the network plan to a third allocation of the network resource in another network plan; and
determine that a difference between the first allocation and the third allocation corresponds to a predetermined threshold,
wherein transmitting the message is based at least in part on the difference corresponding to the predetermined threshold.

11. The network planning system of claim 5,
wherein the network resource comprises a vehicle;
wherein the resource information includes at least one of:

a transmission cost for transmitting an item using the vehicle, an ownership cost for maintaining the vehicle as an available network resource for transmitting items, or a transfer cost for loading the item into the vehicle and unloading the item from the vehicle.

12. The network planning system of claim 11, wherein transmitting the message to configure the network comprises transmitting routing information identifying a time for the vehicle to transmit items from a first location to a second location identified by the transmission leg.

13. A computer-implemented method comprising:

under control of one or more computing devices executing specific computer-executable instructions, identifying a model for generating cost information for a network plan, wherein the model receives as an input an allocation of a network resource to a transmission leg of the network plan for a given transmission demand via a network, and wherein the model provides as an output the cost information indicating a cost for transmitting the item along the transmission leg using the allocation of the network resource;

generating, using the model, a first cost for a first allocation of the network resource;

generating, using the model, a second cost for a second allocation of the network resource;

determining that the first cost of the network resource is less than a second cost of the network resource;

generating the network plan based at least in part on the first allocation and the transmission leg;

determining that the network plan corresponds to a constraint identifying a limitation in a functionality of the network resource for transmitting the item and a network limitation of the network for transmitting the item; and transmitting a message to configure the network according to the network plan.

14. The computer-implemented method of claim 13, wherein determining that the network plan corresponds to the constraint comprises at least one of:

determining that the first allocation of the network resource corresponds to a resource allocation level identified by the constraint; or determining that an attribute of the network plan corresponds to a network attribute identified by the constraint.

15. The computer-implemented method of claim 13, further comprising:

receiving, from the planning device, a planning period identifying a period of time during which the item will be transmitted via the network;

requesting, from a constraint selection engine, at least one constraint that is applicable during the planning period, wherein the constraint received from the constraint selection engine is applicable during the planning period, and wherein the transmission demand indicates a demand level forecasted for the planning period.

16. The computer-implemented method of claim 13, wherein the cost includes a third-party cost for transmitting a portion of the transmission demand exceeding the capacity or the constraint of the network via an alternate network.

17. The computer-implemented method of claim 13, further comprising:

wherein the model comprises an objective function;

determining that a factor included in the model is fixed for a period of time for which the network plan will schedule transmissions;

generating a relaxed allocation for the network resource based at least in part on a linear programming relaxation solution for the objective function, wherein the objective function includes a fixed value for the factor; and generating the first allocation and the second allocation based at least in part on the relaxed allocation.

18. The computer-implemented method of claim 13, further comprising:

comparing the first allocation of the network resource in the network plan to a third allocation of the network resource in another network plan; and determining that a difference between the first allocation and the third allocation corresponds to a predetermined threshold, wherein transmitting the message is based at least in part on the difference corresponding to the predetermined threshold.

19. The computer-implemented method of claim 13, further comprising:

wherein the item comprises packet data, wherein the network comprises a packet data network, wherein the network resource comprises a packet data transceiver, and wherein the message identifies a first location within the network from which the packet data transceiver will receive the item and a second location within the network to which the packet data transceiver will transmit the item identified by the transmission leg.

20. The computer-implemented method of claim 13, wherein the message comprises a forwarding table entry.

* * * * *